US012385717B1

(12) United States Patent
Kowar

(10) Patent No.: US 12,385,717 B1
(45) Date of Patent: Aug. 12, 2025

(54) TWIST-ACTION PEN GUN

(71) Applicant: Christoph Kowar, Vienna (AT)

(72) Inventor: Christoph Kowar, Vienna (AT)

( * ) Notice: Subject to any disclaimer, the term of this patent is extended or adjusted under 35 U.S.C. 154(b) by 0 days.

(21) Appl. No.: 18/704,811

(22) PCT Filed: Jun. 30, 2023

(86) PCT No.: PCT/EP2023/068067
§ 371 (c)(1),
(2) Date: Apr. 25, 2024

(87) PCT Pub. No.: WO2024/235476
PCT Pub. Date: Nov. 21, 2024

(30) Foreign Application Priority Data

May 16, 2023 (AT) .............................. A 60086/2023

(51) Int. Cl.
*F41C 9/02* (2006.01)
*B43K 29/00* (2006.01)

(52) U.S. Cl.
CPC ................ *F41C 9/02* (2013.01); *B43K 29/00* (2013.01)

(58) Field of Classification Search
CPC .................................... F41C 9/00; F41C 9/02
See application file for complete search history.

(56) References Cited

U.S. PATENT DOCUMENTS 1,608,359 A * 11/1926 Biason .................. B43K 25/02 42/51
1,664,049 A 3/1928 Sedgley
1,752,178 A * 3/1930 Huguenin ................. F41C 9/02 42/2
1,772,656 A 8/1930 Abbott
1,877,710 A 9/1932 Joseph, Jr.
1,897,992 A 2/1933 Ailes
2,844,902 A * 7/1958 Gaylord, Jr. .............. F41C 9/02 42/1.09
3,707,794 A 1/1973 Rocha et al.
3,824,727 A * 7/1974 Hudson ..................... F41C 9/02 42/1.09
4,490,935 A * 1/1985 Plachy ...................... F41C 9/02 42/1.09

(Continued)

FOREIGN PATENT DOCUMENTS

DE 557075 C * 8/1932
GB 2565558 A 2/2019

OTHER PUBLICATIONS

International Search Report and Written Opinion received in International Application No. PCT/EP2023/068067 dated Jan. 19, 2024, 13 pages.

*Primary Examiner* — Gabriel J. Klein
(74) *Attorney, Agent, or Firm* — Liang & Hennessey; Brian E. Hennessey

(57) ABSTRACT

A complete concealed, handheld, single shot pen gun having the full appearance of a well-designed twist action pen equipped with full writing function is presented. The invention provides seamless design without surface interruptions. A drop safety function locks the firing pin in a safe position. The drop safety cannot be deactivated by accident. After activation of the drop safety, the loaded pen gun is suitable for daily use as a regular twist action pen. The exchangeable pen refill can be extended and retracted; accidental triggering of the cartridge is not possible.

21 Claims, 6 Drawing Sheets

(56) References Cited

U.S. PATENT DOCUMENTS

| | | | | | |
|---|---|---|---|---|---|
| 5,062,230 | A * | 11/1991 | Braverman | F41A 19/25 | |
| | | | | 42/1.09 | |
| 5,062,231 | A * | 11/1991 | Braverman | F41C 9/02 | |
| | | | | 42/1.09 | |
| 2020/0132413 | A1 * | 4/2020 | Laing | F41C 9/02 | |

* cited by examiner

TWIST-ACTION PEN GUN

CROSS-REFERENCE TO RELATED APPLICATIONS

The present application is a national phase application of PCT Application No. PCT/EP2023/068067, filed Jun. 30, 2023, entitled "TWIST-ACTION PEN GUN", which claims the benefit of Austrian Patent Application No. A 60086/2023, filed May 16, 2023, each of which is incorporated by reference in its entirety.

BACKGROUND OF THE INVENTION

1. Field of the Invention

The present invention relates to a pen gun, having a pen-shaped body, the pen gun providing a twist-action handle for actuating a control bolt. In particular, the present invention relates to a pen gun which provides full functionality both as a firearm and as a retractable twist-action pen.

2. Description of the Related Art

Guns with the dimension of a pen, generally referred as pen guns or zip guns are known from the prior art. Such zip guns usually lack any form of safety or locking mechanism, making these kinds of instruments prone to errors and (possibly fatal) accidents.

Another drawback of zip guns are possible operator errors. The operator must pull back the tip of the firearm without a locking in order to compress the firing pin assembly and the release must be done right and quick in order to trigger a shot.

From U.S. Pat. No. 4,490,935 a combined writing instrument and hand-held firearm is known. The firearm disclosed therein includes a firing pin which is in permanent contact with the primer of the cartridge. There is no form of lock or safety, which keeps the firing pin in a safe position away from the cartridge. Only a small spring is disposed between the firing pin and the primer of the cartridge. A drop from a certain height and the resulting mass inertia of the firing pin could overcome the spring resistance and lead to an accidental triggering of the cartridge. Although the firearm is described as safe, in practice, the barrel needs to be uncrewed slightly from the receiver to avoid accidents.

From U.S. Pat. No. 5,062,230 a pen gun with a locking mechanism is known. The firing spring is thereby locked, such that the firearm can be carried loaded and cocked safely. However, such firearms usually suffer from an external appearance, that leaves no room for doubt about the purpose as a firearm.

SUMMARY OF THE INVENTION

It is thus an object of the present invention to improve pen guns of the aforementioned kind in terms of easy and safe operation with a fully concealed appearance. In particular, it is an object of the invention to allow a safe and quick locking of the pen gun, which allows carrying the loaded firearm without any risk of accidental triggering, while still maintaining a smooth and unaltered surface that resembles a regular writing pen.

The present invention solves the stated objects by providing a pen gun according the independent claim.

Further preferable embodiments of the pen gun are provided according to the dependent claims.

According to an aspect of the invention, the pen gun includes a pen-shaped body with a barrel portion including a barrel for loading a cartridge, a receiver portion providing a receiver and a handle portion including a switch handle, the receiver housing a firing pin assembly. Through the pen shaped body, the firearm may provide a completely seamless design without any kind of surface interruptions and disturbances. In particular, it provides a pen gun with no external features referring to a firearm, hence having an outer appearance resembling a conventional steel regular twist action ball pen. The firearm functionality of the inventive pen gun may therefore be fully concealed. According to an aspect of the invention, the firing pin assembly includes a firing pin housing and a firing pin slidably received with its rear end therein, a control bolt slidably received in the firing pin housing being translationally connected to the firing pin and rotatably connected to the switch handle, and a firing pin lock received in the firing pin housing.

It is understood that the receiver housing the firing assembly may comprise the firing assembly at least partially and that other parts from the firing pin assembly may protrude from the receiver portion into either the barrel portion or the handle portion.

A very compact pen gun can thus be provided, where all internal parts are concealed within the body of the pen gun and are axially aligned, thereby further resembling the appearance of a conventional twist-action pen for writing purposes.

According to a further aspect of the invention, the firing pin includes a first notch for engaging with the firing pin lock, providing a first safety for the firing pin in an uncocked position, and a second notch for engaging with the firing pin lock, providing a second safety for the firing pin in a cocked position. By providing a firing pin with a first notch, with which the firing pin lock of the firing pin assembly can engage, a first safety ("drop safety") is provided, which can ensure highest safety standards when carrying the loaded firearm and while using the pen gun as a regular twist action pen. With the firing pin lock positioned in the first notch of the firing pin, the firing pin may be held safely in a retracted position when uncocked, thus making no contact with the cartridge. Even when shocks are absorbed by the pen gun, the moment of inertia may not drive the firing pin to accidentally trigger the cartridge.

Preferably, the drop safety cannot be deactivated by accident or shock and locks the firing pin in a safe position until the firing pin is cocked, and the firing pin lock is engaged with the second notch of the firing pin. In the cocked position, the firing pin is again held safely in position by the firing pin lock, such that a second safety ("trigger safety") is formed. The second safety prevents an unwanted triggering of the cartridge and also secures the firing pin against release due to shock or false operation.

According to a further aspect of the invention, the control bolt includes a first guide for guiding a guiding member of the firing pin. The guide is configured to move, upon rotation of the switch handle, the firing pin in the uncocked position and engage the firing pin lock with the first notch of the firing pin, and to move, upon pulling the switch handle backwards, the firing pin in the cocked position and engage the firing pin lock with the second notch of the firing pin. With the control bolt having the guide as described before, a very easy and safe operation of the pen gun may be provided. Thereby the activation of the first safety may easily be achieved by rotating the switch handle. After the first safety is activated, a deactivation of the safety on purpose or on accident, e.g. through the switch handle, is prevented.

In that the functionality of the pen gun is provided by only a few specially machined parts, a simple and inexpensive manufacturing of the pen gun can be achieved. The majority of other parts are readily available standard parts.

It is generally noted that throughout this description reference will be made to the following meaning of the given directions:

Front: end of the pen gun-portion including the barrel/the muzzle;

Back/Rear: end of the pen gun portion including the switch handle;

Forward: in the direction towards the muzzle;

Backward: in the direction away from the muzzle, towards the switch handle; and

Clockwise and Counterclockwise rotation are always in view of the forward direction.

In the following, further embodiments of the invention are illustrated. The embodiments shown, or individual partial aspects of the embodiments, can be combined with one another as desired, unless otherwise indicated. According to one embodiment of the invention, the firing pin assembly further includes a firing pin spring disposed between the firing pin and the firing pin housing. The firing pin spring may further improve the function of the first safety, as it presses the firing pin in the direction of the cartridge while the firing pin lock is engaged with the first notch of the firing pin. Thus, the firing pin lock is pressed against the first notch and an accidental release of the firing pin may be prevented.

According to one embodiment of the invention, the firing pin spring rests against a front spring rest of the firing pin housing and a spring rest of the firing pin. The functioning of the firing pin assembly may thus be achieved with a compact and simple construction.

According to one embodiment of the invention, the firing pin assembly further includes a trigger spring disposed between the control bolt and the firing pin housing. The trigger spring may serve for exerting a trigger force on the firing pin in the cocked position.

According to one embodiment of the invention, the trigger spring rests against a back spring rest of the firing pin housing and a spring rest of the control bolt.

According to one embodiment of the invention, the control bolt further includes a lock notch for receiving the firing pin lock, thereby restricting the rotational movement of the control bolt, providing a third safety against removing the first and second safety. The firing pin lock, housed in the firing pin housing, can slide or protrude into the lock lit, when the control bolt is in the desired rotational position, thus locking the rotational degree of freedom of the control bolt. The rotational lock prevents, that the firing pin lock is removed from the first or second notch by rotating the control bolt or firing pin, thus, providing a third safety.

According to one embodiment of the invention, the firing pin assembly is held inside the receiver by means of a securing member.

According to another embodiment, the securing member is formed by a threaded end of the firing pin housing, threading into the inside of the receiver. Thus, the firing pin housing and receiver may easily be assembled by screwing the firing pin housing with the firing pin assembly and the control bolt into the receiver.

According to another embodiment, the securing member is formed by a snap ring, held in a snap ring notch in the rear end of the receiver resting against the firing pin housing. Alternatively, the firing pin housing and receiver may easily be assembled by securing the firing pin housing with the firing pin assembly and the control bolt into the receiver by inserting a snap ring after the firing pin assembly into the rear end of the receiver.

According to one embodiment of the invention, the barrel portion is removably connected to the receiver portion. Hence, the barrel may be easily removed for inserting a cartridge into the barrel or for removing a used cartridge from the barrel.

According to one embodiment of the invention, the receiver includes a breech block, whereby the cartridge rests against the front side of the breech block. With the breech block being contained in the receiver, the loading of the cartridge into the barrel can be very easily achieved by simply inserting the cartridge in the barrel and connecting the barrel to the receiver, thereby bringing the rear end of the cartridge in contact with the breech block.

According to one embodiment of the invention, the breech block includes an aperture for the firing pin to protrude through the breech block to the cartridge. A very simple and robust design may thus be provided by the inventive pen gun.

The aperture in the breech block for the firing pin to protrude through may either be positioned in the center of the breech block (for loading centerfire cartridges) or may be positioned off-center in the breech block (for loading rimfire cartridges).

According to one embodiment of the invention, the barrel portion includes a barrel thread, threading into a receiver threading of the receiver portion. By connecting the barrel portion and the receiver portion via threads, an easy to use and robust pen gun may be provided. The loading of a cartridge may quickly be achieved by unscrewing the barrel, loading the cartridge and rescrewing the barrel to the receiver.

According to one embodiment of the invention, the handle portion houses a pen assembly including a pen refill, a pen spring and a pen bolt, whereby the pen assembly rests with the pen spring against a rear part of the handle portion. Thus, a real pen can be provided, which can be turned into a small caliber firearm, ready to fire within a second in a simple and logical way.

The pen refill may be a ball point pen refill, a pencil refill, or any other pen refill.

According to a further embodiment of the invention, the control bolt includes a rear bore for receiving the pen bolt and a second guide for guiding a guiding member of the pen bolt, the second guide being configured to move, upon rotation of the switch handle, the pen refill from a retracted position to an extended position. Hence, an easy and reliable mechanism can be provided, whereby the pen, the safety, the cocking and the triggering mechanisms can all be actuated by the same switch handle.

According to a further embodiment of the invention, the handle portion includes a handle thread, threading onto a rear threading of the control bolt. Easy assembly and maintenance of the pen gun can thus be achieved.

According to a further embodiment of the invention, the barrel includes a plug on its front end, forming a pen tip. The plug may be inserted from the muzzle, i.e. the front end, into the barrel and thereby close the barrel. Firstly, this serves as a sealing for the barrel, thus preventing dirt and moisture from entering. Secondly, the plug serves aesthetic purposes and conceals the barrel by mimicking a pen with a ball tip opposite the refill.

According to one embodiment of the invention, the first guide in the control bolt is a first link guide including a first circular curve for translationally moving the firing pin backwards upon rotation of the control bolt. Hence, the control bolt can be rotationally activated by the twist action handle and transfers this rotational movement over to the firing pin guiding member that is guided in the first link guide. Through the first circular curve, the guiding member is translationally actuated and, thus, moves the firing pin in a direction away from the muzzle. The second circular curve is preferably a spiral or helical curve.

According to a further embodiment, the first link guide includes a second linear curve for allowing a translational movement of the control bolt with the firing pin in the cocked position, thereby lifting the firing pin lock out of the second notch of the firing pin. Through the second linear curve, the switch handle may be pressed in the direction towards the muzzle, thereby exerting a translational force on the control bolt. The firing pin is in the cocked position and the firing pin guiding member is guided in the first link guide along the second curve. Thus, the firing pin guiding member is free to be pushed towards the back of the control bolt, while the control bolt itself is freed to be pushed forward and exert force on the firing pin lock, hence, disabling the second safety and allowing the firing pin spring to release and trigger the cartridge. A simple yet safe mechanism for triggering a pen gun can thus be provided.

In the following, the embodiments of the pen gun according to this invention are presented in alternative wording. The following description may not be seen as limiting the invention set out by the claims but rather as providing better understanding of the claims and description above.

The pen gun according to an embodiment of this invention represents a completely concealed single shot firearm referred to as a pen gun. This invention is however not limited to the mere shape of a writing instrument, but rather brings all features of a well-designed twist action pen.

The body of the pen gun is comprised of three cylindrical components, namely a barrel portion, a receiver portion and a handle portion, all made of rigid material, preferably chrome molybdenum steel or stainless steel. The front portion, referred to as barrel portion, has a muzzle at the front which can be plugged for aesthetical reasons and for concealing the barrel disposed therein. The back side of the barrel provides a chamber for the cartridge. The connection with the center portion, i.e. the receiver portion, will be achieved through a thread. A ring seal prevents loosening of the components. The receiver, threaded to engage the barrel, is the main component of the firearm. The receiver includes the breech block and a cylindrical bore which houses the firing pin assembly. Approximately half of the control bolt is contained within the receiver portion, while the other half protrudes into the handle portion. The receiver provides functionality for controlling safety of the firearm, writing, cocking and triggering features. Within the receiver, the control bolt is a part of the firing pin assembly. The rear portion of the body, i.e. the handle portion, contains most of the pen parts and is connected to the receiver via the control bolt thread. The rear portion works as both the switch handle of the firearm and the twist-action pen. It can be referred to as the trigger of the firearm as well. It is designed to operate the control bolt in order to activate the drop safety, to cock and to trigger the firearm, also the pen refill can be extended and retracted with this handle.

This pen gun provides a drop safety to ensure safe carrying of the firearm after the loaded barrel has been screwed on to the receiver. To activate the drop safety, the rear component needs a 270-degree rotation clockwise. Then the firing pin will be pulled back against the spring resistance behind the breech line and the control bolt will keep it form-locked in a safe position. The drop safety is locked and cannot be deactivated by accident. After activation of the drop safety the rear component can be rotated counterclockwise and clockwise to extend and retract the pen refill without impact on the activated drop safety.

Cocking the firearm is done with a retracted ball pen refill. Thereby the rear portion (i.e. the switch handle) needs to be pulled backwards until it will safely click into place achieved by the spring-loaded firing pin lock. This will compress the firing spring of the firing pin assembly sufficiently. To trigger the firearm, the rear portion needs a 90-degree rotation counterclockwise to unlock the trigger movement. After unlocking, the rear portion needs to be pushed forward in order to release the firing pin lock in the firing pin assembly and the firing pin spring pushes the firing pin forward into the breech block. The breech block is provided with an aperture and the tip of the firing pin will hit the primer of the cartridge through the aperture. The firing pin will hit the primer with sufficient kinetic energy to trigger the cartridge and the aesthetic plug inside the muzzle will be expelled due to the high pressure in front of the bullet or by the bullet itself.

BRIEF DESCRIPTION OF THE DRAWINGS

In the following, preferred embodiments of the invention are described with reference to the drawings.

DETAILED DESCRIPTION

In the following, the pen gun 100, 101 according to the present invention is described with reference to the drawings. According to a first embodiment of the invention, a pen gun 100 for receiving and firing rimfire cartridges 5 is described. According to a second embodiment of the invention, a pen gun 101 for receiving and firing centerfire cartridges 5*a* is described.

Embodiment for Rimfire Cartridges

Figure 1:
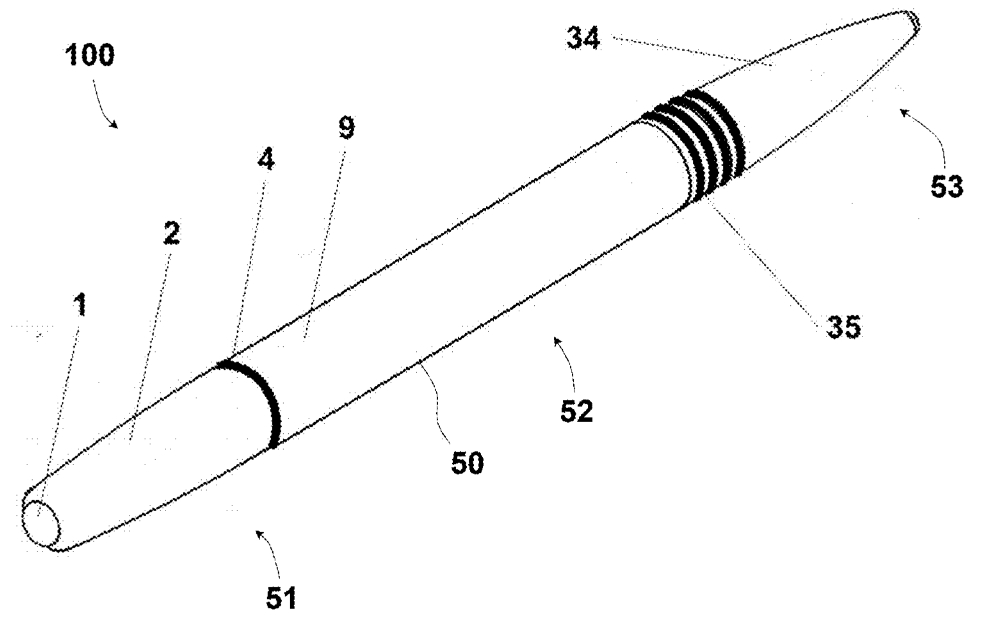
FIG. 1 shows an axonometric view of the exterior of the pen gun according to the present invention.

Referring to the drawings, a pen gun 100 according to a first embodiment of the invention is shown in FIG. 1. The pen gun 100 includes a barrel 2 plugged with an aesthetic plug 1 in form of a plastic ball. The barrel is connected in axial alignment by a barrel threading 3 to the receiver 9. A seal ring 4 placed between barrel 2 and receiver 9 prevents loosening of the connection. With a multifunctional switch handle 34, all features of the pen gun 100 can be operated by a twist-action as described in the following. Grip rings 35 on the switch handle 34 ensure sufficient grip for safe and easy handling.

Figure 2:
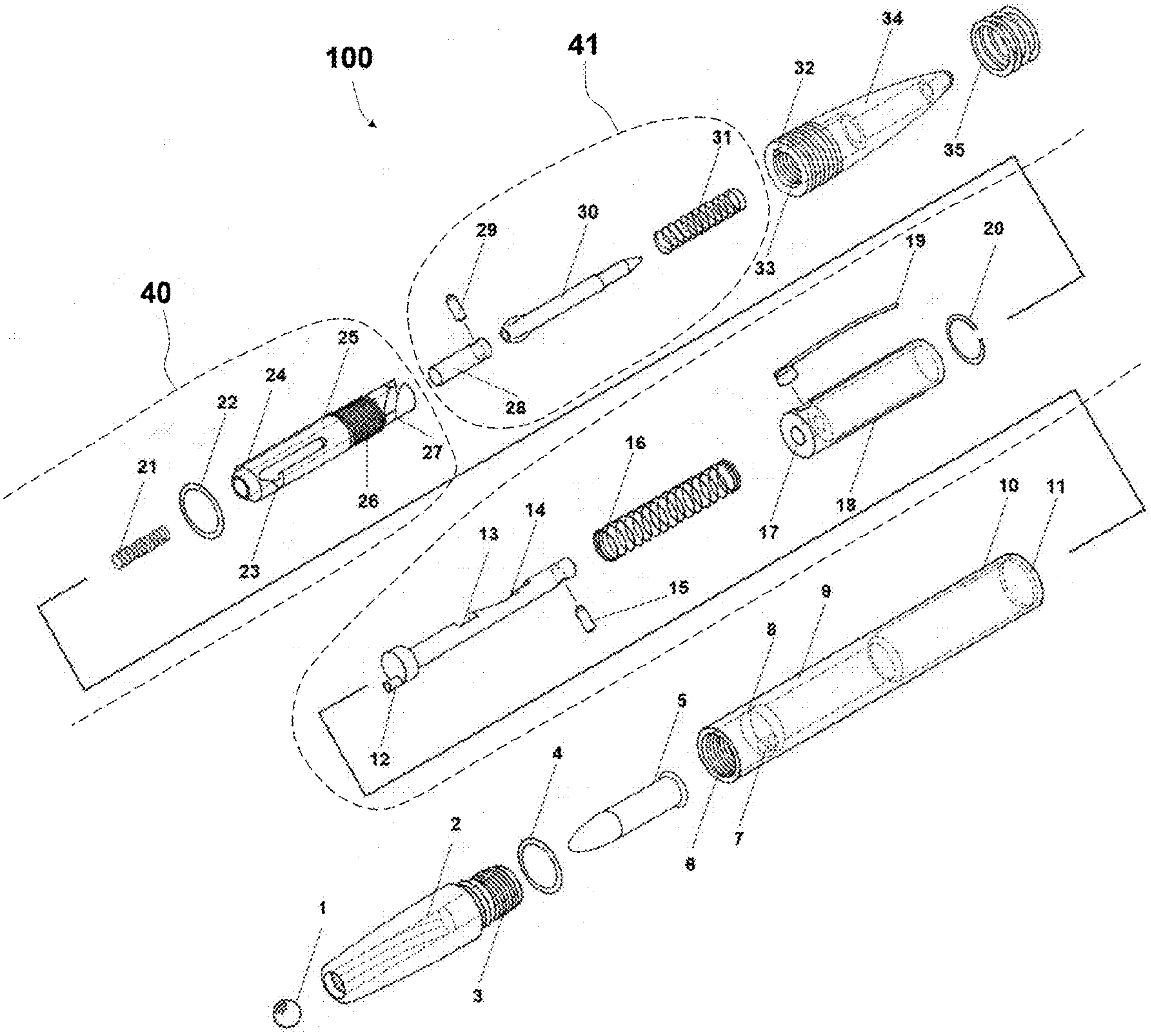
FIG. 2 shows an exploded view of the pen gun according to a first embodiment of the invention, the pen gun being adapted for rimfire cartridges.

FIG. 2 shows all parts of the present invention according to an exploded-view drawing. Thin dashed lines provide information about hidden lines inside the components.

Figure 4:
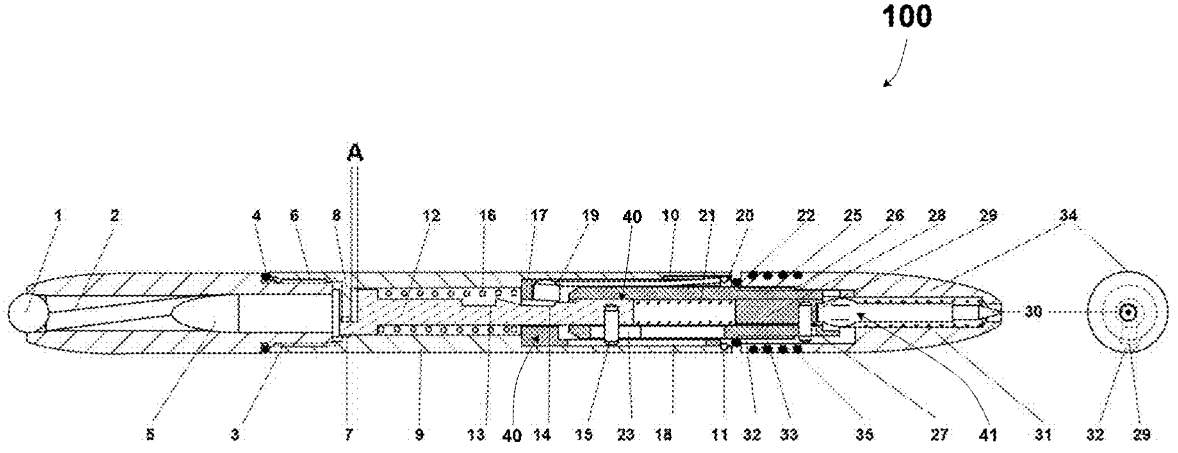
FIG. 4 shows a longitudinal section and a cross section of the pen gun according to the first embodiment with a rimfire cartridge in the chamber without activated first safety ("drop safety"). In this position the firing pin could strike the primer of the cartridge.

FIG. 4 shows the present invention after the barrel 2 has been loaded with a cartridge 5 and screwed on the receiver 9 through barrel threading 3 and receiver threading 6. The first safety ("drop safety") is not activated and the firing pin 12 can hit the primer of the cartridge 5, spacing A defines the unsafe position of the firing pin 12. The multifunctional switch handle 34 is in a loose position and not pressed on the receiver 9. The firing pin lock 19 is not locked into the first notch 14 of the firing pin 12. The pen mine refill 30 is in the retracted position.

Figure 5:
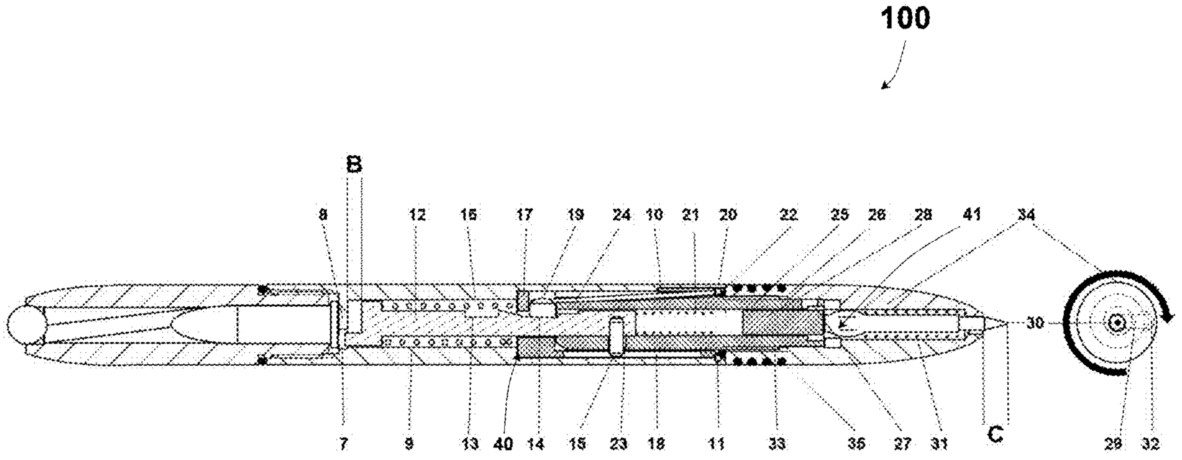
FIG. 5 shows a longitudinal section and a cross section of the pen gun according to the first embodiment after activation of the drop safety. The firing pin is locked backwards from the breech block. The pen refill is extended.

FIG. 5 shows the present invention after activation of the drop safety. To activate the drop safety, the switch handle 34 is rotated by 270 degrees clockwise. A 180-degree rotation clockwise will extend the pen refill 30 by a linear movement of the pen bolt 28 to the extended position. Spacing C defines the extended pen refill 30 position.

The guiding notch 32 inside the switch handle 34 ensures the axial movement of the pen bolt 28 and the guiding member 29 of the pen bolt 28. The rotational and translational movement of the pen bolt 28 and the guiding member 29 of the pen bolt 28 inside the second link guide 27 of the control bolt 25 is limited to 180 degrees and spacing C.

A rotation of 270 degrees clockwise of the switch handle 34 will rotate the control bolt 25 inside the firing pin housing 17 by 90 degrees clockwise. The firing pin guiding member 15 guided in the firing pin guiding slot 18 will slide backwards within the first helical curve of the first link guide 23 of the control bolt 25. Spacing B defines the drop safety position of the firing pin 12 behind the breech block 8. In this first safety position, the firing pin 12 cannot engage with the primer of the cartridge 5. Triggering the cartridge 5 is thus not possible.

Additionally, the firing pin lock 19 locks the firing pin 12 through the first notch 14 of the firing pin 12 and locks the control bolt 25 through the lock notch 24 against rotary movement. This slight compression of the firing pin spring 16 now keeps the control bolt 25 and the switch handle 34 inside the receiver 9. The axial locking of the firing pin housing 17 is achieved through the snap ring 20 inside the snap ring notch 11. The firing pin housing 17 is secured against rotation through the firing pin lock 19 inside the position notch 10.

Figure 6:
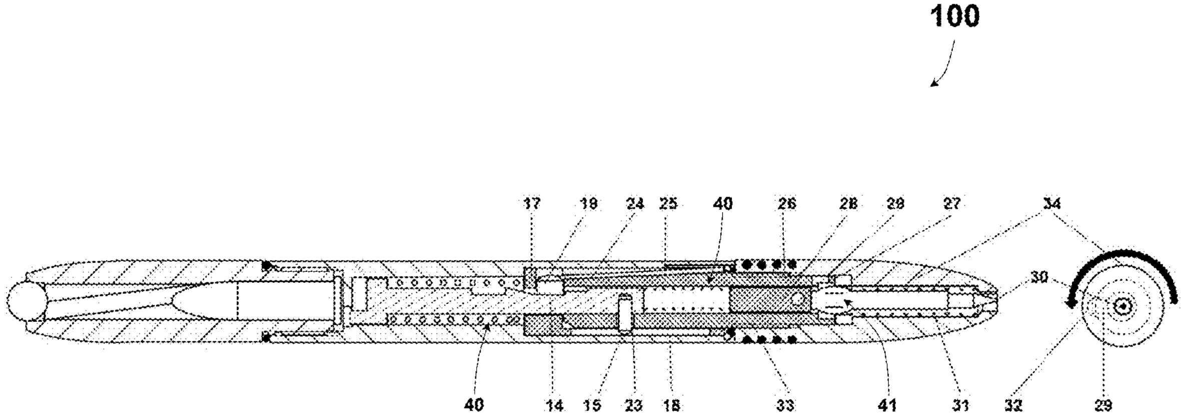
FIG. 6 shows a longitudinal section and a cross section of the pen gun according to the first embodiment after the drop safety has been activated, with the pen function in use and the pen retracted.

In FIG. 6, the pen gun 100 with activated drop safety and retracted pen refill 30 is shown. This will be achieved by a 180-degree rotation of the switch handle 34 counterclockwise. The pen bolt 28, guided through the guiding member 29 slides forward within the helical curve of the second link guide 27 of the control bolt 25 and sliding notch 32. The pen spring 31 keeps the pen refill 30 in the front position.

Figure 7:
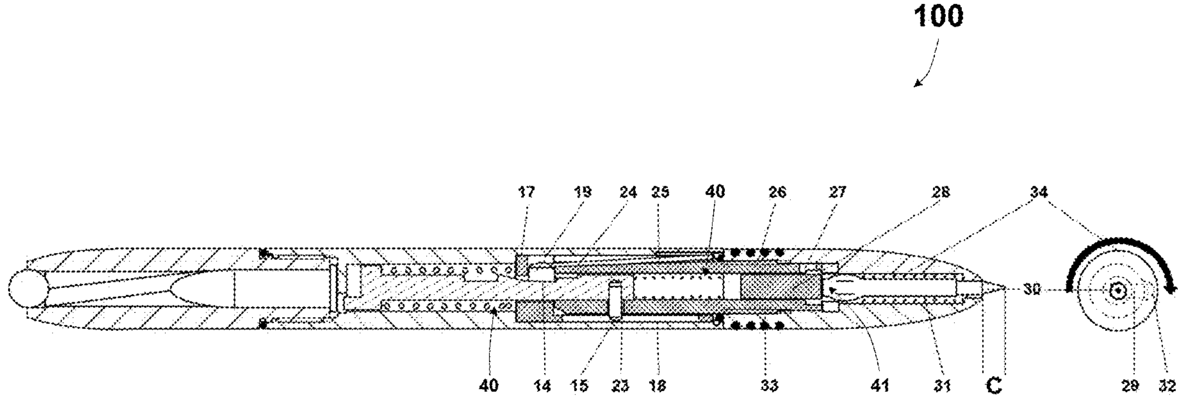
FIG. 7 shows a longitudinal section and a cross section of the pen gun according to the first embodiment after the drop safety has been activated, with the pen function in use and the pen extended.

In FIG. 7, the pen gun 100 with activated drop safety and extended pen refill 30 is shown. This will be achieved by a 180-degree rotation of the switch handle 34 clockwise. The pen bolt 28, guided through the guiding member 29 slides backwards within the helical curve of the second link guide 27 of the control bolt 25 and sliding notch 32. The damper seal ring 22 ensures a smooth rotation movement of the switch handle 34.

Figure 8:
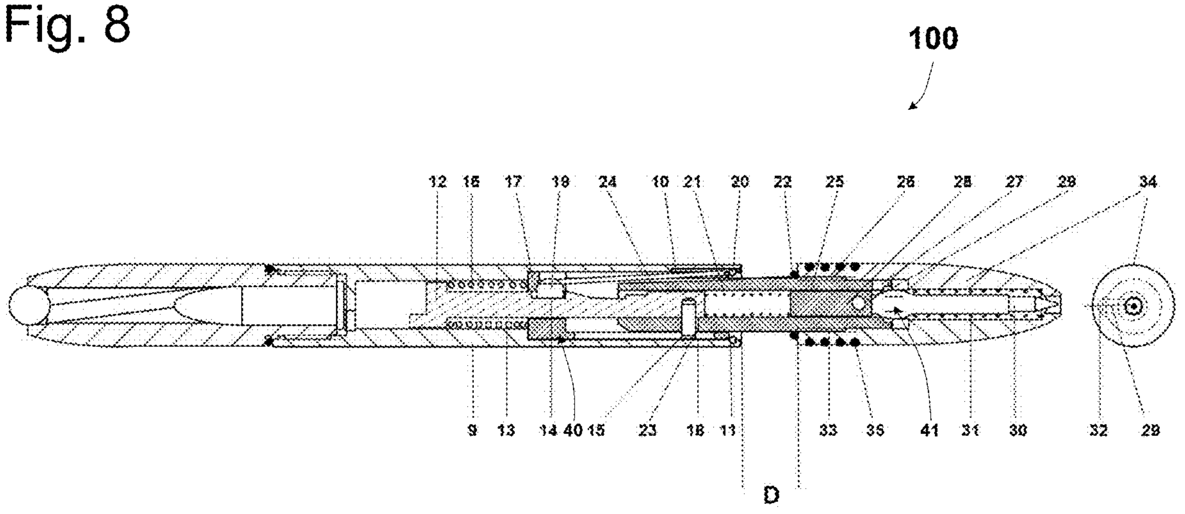
FIG. 8 shows a longitudinal section and a cross section of the pen gun according to the first embodiment with the firing pin in the cocked position. The second safety ("trigger safety") is activated.

In FIG. 8, the pen gun 100 with retracted pen refill 30 is shown. The firing pin assembly is cocked and locked. The second safety ("trigger safety") is active. The cocking will be achieved by pulling the switch handle 34 backwards until spacing D has been reached between receiver 8 and handle 34. The switch handle 34 is connected with the control bolt 25 through the control bolt threading 26 and switch handle threading 33. The firing pin lock 19 locks into the second notch 13 of the firing pin 12 under spring tension. This compresses the firing pin spring 16. In this position, the switch handle 34 cannot be pushed into the front position.

Figure 9:
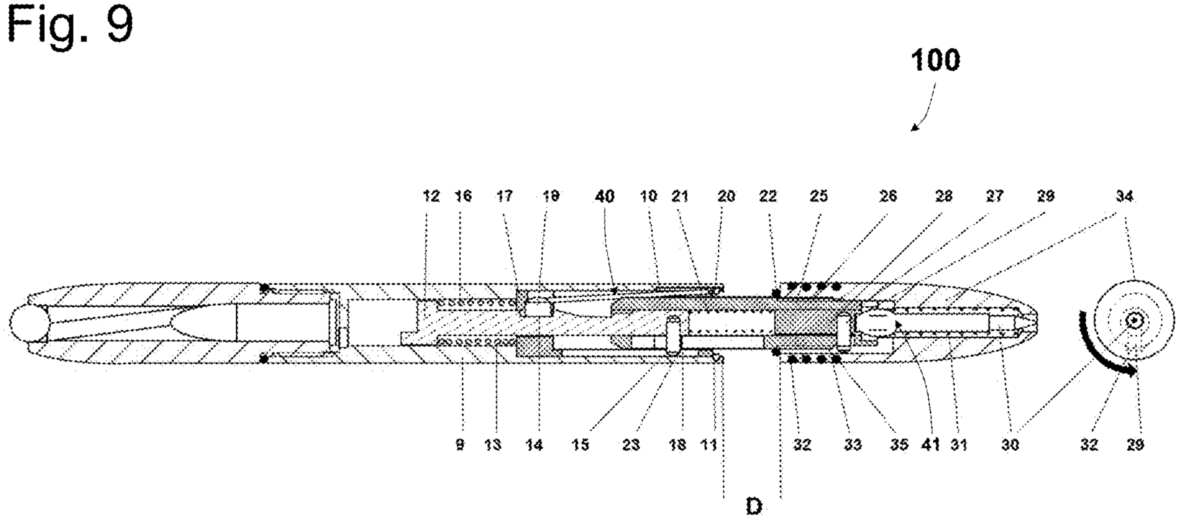
FIG. 9 shows a longitudinal section and cross section of the pen gun according to the first embodiment with a cocked and ready to fire firing pin. The trigger safety is deactivated.

FIG. 9 shows the deactivated trigger safety. This will be achieved by a 90-degree rotation of the switch handle 34 counterclockwise. This movement rotates the control bolt 25 inside the firing pin housing 17 and allows the control bolt 25 to slide into the front position. The firing pin guiding member 15 slides backwards within the second linear curve of the first link guide 23 of the control bolt 25. The trigger spring 21 provides a two-stage trigger and additional force for triggering the primer of the cartridge 5.

Figure 10:
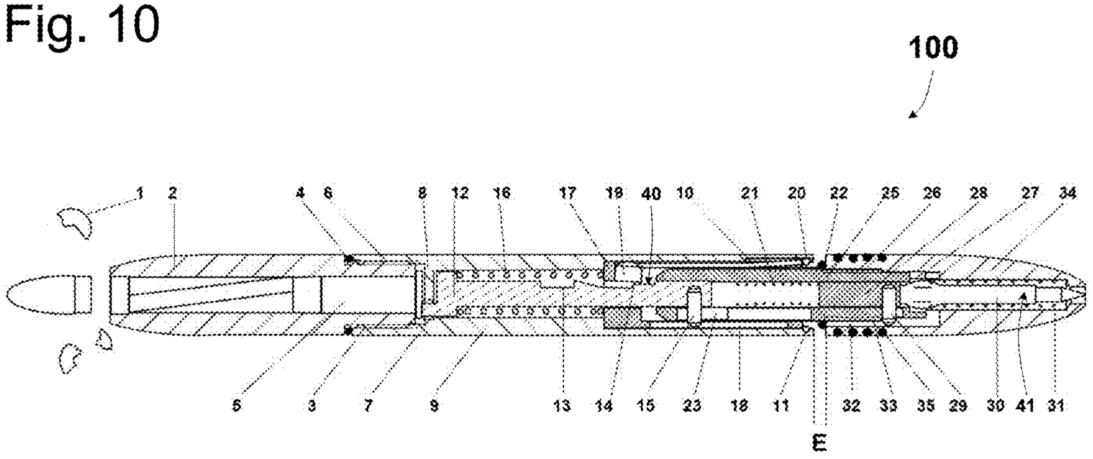
FIG. 10 shows a longitudinal section of the pen gun according to the first embodiment after the cocked firing pin has been released and a shot was triggered. The firing pin hit the cartridge and the bullet expelled the aesthetic plug.

In FIG. 10 the cocked firing pin 12 has been triggered. The switch handle 34 has been pushed forward until spacing E has been reached. This lifts the firing pin lock 19 out of the second notch 13 of the firing pin 12 and releases the firing pin 12. Spacing E defines the position when the firing pin 12 will be released and can be referred to as the trigger point. The firing pin spring 16 pushes the firing pin 12 forward to the breech block 8. The tip of the firing pin will hit the primer of the cartridge 5 through the aperture 7. This will trigger the cartridge and release a shot. The muzzle plug 1 will be expelled and destroyed with the projectile leaving the barrel.

Embodiment for Centerfire Cartridges

Figure 3:
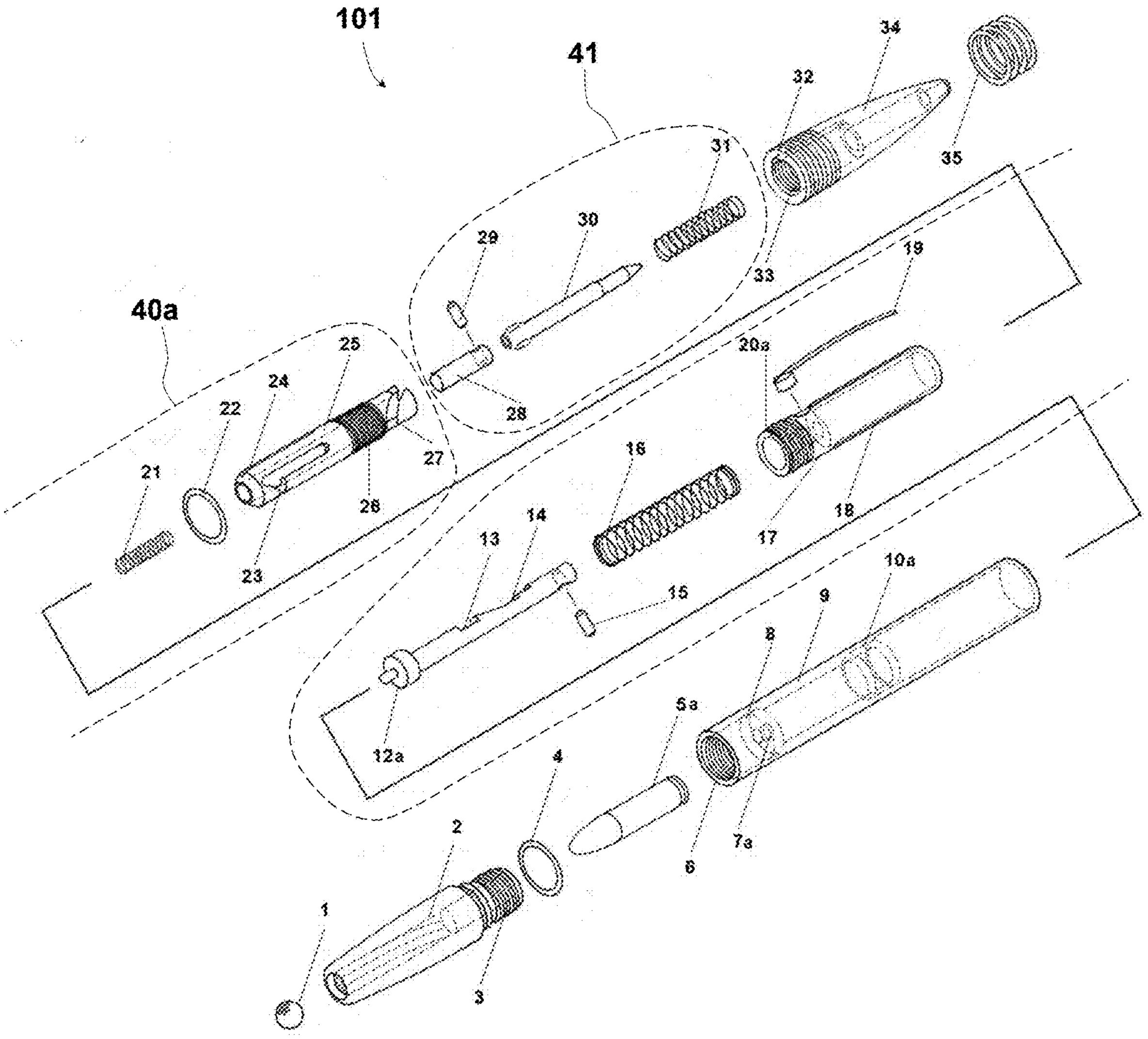
FIG. 3 shows an exploded view of the pen gun according to a second embodiment of the invention, the pen gun being adapted for centerfire cartridges.

FIG. 3 shows all parts of the present invention for centerfire cartridges with an exploded view drawing. Thin dashed lines provide information about hidden lines inside the components.

It is noted that the above given description of the functionality of the pen gun 100 according to the first embodiment, can mutatis mutandis be applied to the pen gun 101 according to the second embodiment, unless otherwise stated.

Compared to the rimfire embodiment, the embodiment for centerfire cartridges 5*a* differs only in the centerfire breech block aperture 7*a*, which is centrally positioned, as well as in an internal assembly thread 10*a* in the receiver, as well as in and centrally positioned firing pin 12*a* and an external firing pin housing thread 20*a*. The firing housing 17 firmly screwed into the receiver 9, ensures a secure retainment of the firing pin housing 17 inside the receiver 9. A radial alignment of the firing pin 12*a* with the centerfire breech block aperture 7*a* can be omitted. Compared to the rimfire embodiment shown on FIG. 2 Positioning notch 10 and snap ring 11 can be omitted.

REFERENCE NUMBERS IN THE DRAWINGS

1 Muzzle plug
2 Barrel
3 Barrel thread
4 Retaining seal ring
5 Rimfire cartridge
5*a* Centerfire cartridge
6 Receiver thread
7 Breech block aperture (rimfire)
7*a* Breech block aperture (centerfire)
8 Breech block
9 Receiver
10 Positioning notch
10*a* Assembly thread
11 Snap ring notch
12 Firing pin (rimfire)
12*a* Firing pin (centerfire)
13 Second notch of the firing pin
14 First notch of the firing pin
15 Firing pin guiding member
16 Firing pin spring
17 Firing pin housing
18 Firing pin guiding slot
19 Firing pin lock
20 Snap ring
20*a* Firing pin housing thread
21 Trigger spring
22 Damper seal ring
23 First link guide
24 Lock notch
25 Control bolt
26 Control bolt thread
27 Second link guide
28 Pen bolt
29 Guiding member of the pen bolt
30 Pen refill
31 Pen spring
32 Guiding notch
33 Switch handle thread
34 Switch handle
35 Grip rings
40 Firing pin assembly
41 Pen assembly
50 Body
51 Barrel portion
52 Receiver portion
53 Handle portion
100 Pen gun (rimfire)
101 Pen gun (centerfire)

The invention claimed is:

1. A pen gun, comprising:

a pen-shaped body with a barrel portion comprising a barrel for loading a cartridge;

a receiver portion providing a receiver, said receiver housing a firing pin assembly; and a handle portion comprising a switch handle;

wherein the firing pin assembly comprises a firing pin housing and a firing pin slidably received with its rear end therein, a control bolt slidably received in the firing pin housing being translationally connected to the firing pin and rotatably connected to the switch handle, and a firing pin lock received in the firing pin housing;

wherein the firing pin comprises a first notch for engaging with the firing pin lock, providing a first safety for the firing pin in an uncocked position, and a second notch for engaging with the firing pin lock, providing a second safety for the firing pin in a cocked position; and wherein the control bolt comprises a first guide for guiding a guiding member of the firing pin, said first guide being configured to move, upon rotation of the switch handle, the firing pin in the uncocked position and engage the firing pin lock with the first notch of the firing pin, and to move, upon pulling the switch handle backwards, the firing pin in the cocked position and engage the firing pin lock with the second notch of the firing pin.

2. The pen gun according to claim 1, wherein the firing pin assembly further comprises a firing pin spring disposed between the firing pin and the firing pin housing.

3. The pen gun according to claim 2, wherein the firing pin spring rests against a front spring rest of the firing pin housing and a spring rest of the firing pin.

4. The pen gun according to claim 1, wherein the firing pin assembly further comprises a trigger spring disposed between the control bolt and the firing pin housing.

5. The pen gun according to claim 4, wherein the trigger spring rests against a back spring rest of the firing pin housing and a spring rest of the control bolt.

6. The pen gun according to claim 1, wherein the control bolt further comprises a lock notch for receiving the firing pin lock, thereby restricting the rotational movement of the control bolt, providing a third safety against removing the first and second safety.

7. The pen gun according to claim 1, wherein the firing pin assembly is held inside the receiver by means of a securing member.

8. The pen gun according to claim 7, wherein the securing member is formed by a firing pin housing thread, threading into the inside of the receiver.

9. The pen gun according to claim 7, wherein the securing member is formed by a snap ring, held in a snap ring notch in the rear end of the receiver resting against the firing pin housing.

10. The pen gun according to claim 1, wherein the barrel portion is removably connected to the receiver portion.

11. The pen gun according to claim 10, wherein the receiver comprises a breech block, whereby the cartridge rests against the front side of the breech block.

12. The pen gun according to claim 11, wherein the breech block comprises an aperture for the firing pin to protrude through the breech block to the cartridge.

13. The pen gun according to claim 12, wherein the breech block aperture is positioned in a center of the breech block.

14. The pen gun according to claim 12, wherein the breech block aperture is positioned off-center of the breech block.

15. The pen gun according to claim 11, wherein the barrel portion comprises a barrel thread, threading into a receiver thread of the receiver portion.

16. The pen gun according to claim 1, wherein the handle portion houses a pen assembly comprising a pen refill, a pen spring, and a pen bolt, whereby the pen assembly rests with the pen spring against a rear part of the handle portion.

17. The pen gun according to claim 16, wherein the control bolt comprises a rear bore for receiving the pen bolt and a second guide for guiding a guiding member of the pen bolt, said second guide being configured to move, upon rotation of the switch handle, the pen refill from a retracted position to an extended position.

18. The pen gun according to claim 16, wherein the handle portion comprises a handle thread, threading onto a control bolt thread.

19. The pen gun according to claim 1, wherein the barrel comprises a plug on its front end, forming a pen tip.

20. The pen gun according to claim 1, wherein the first guide in the control bolt is a first link guide comprising a first circular curve for translationally moving the firing pin backwards upon rotation of the control bolt.

21. The pen gun according to claim 20, wherein the first link guide comprises a second linear curve for allowing a translational movement of the control bolt with the firing pin in the cocked position, thereby lifting the firing pin lock out of the second notch of the firing pin.

* * * * *